United States Patent
Deshpande et al.

(10) Patent No.: US 8,606,867 B2
(45) Date of Patent: Dec. 10, 2013

(54) REMOVING OR CORRECTING EMAIL RECIPIENTS FROM AN EMAIL CHAIN

(75) Inventors: Bansidhar Arvind Deshpande, Maharashtra (IN); Jeffrey Gartner, Hopewell Junction, NY (US); Joel Silverman, Edison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 238 days.

(21) Appl. No.: 13/082,778

(22) Filed: Apr. 8, 2011

(65) Prior Publication Data

US 2012/0259928 A1    Oct. 11, 2012

(51) Int. Cl.
*G06F 15/16*    (2006.01)

(52) U.S. Cl.
USPC .......................................... 709/206; 709/224

(58) Field of Classification Search
USPC ................................................ 709/206, 224
See application file for complete search history.

(56) References Cited

U.S. PATENT DOCUMENTS

| | | | | |
|---|---|---|---|---|
| 7,499,976 | B2* | 3/2009 | Cato | 709/207 |
| 8,321,517 | B2* | 11/2012 | Li et al. | 709/206 |
| 2005/0278430 | A1* | 12/2005 | Cato | 709/206 |
| 2008/0114846 | A1 | 5/2008 | Sano | |
| 2010/0235452 | A1 | 9/2010 | Fukasawa et al. | |
| 2010/0281122 | A1* | 11/2010 | Li et al. | 709/206 |

* cited by examiner

*Primary Examiner* — Moustafa M Meky (57) ABSTRACT

An email server receives an email. The email has a list of email addresses that includes the sender email address and the recipient addresses. The email is then sent to the recipients. An indication associated with one of the email addresses, such as the email address is invalid, the email address is for an incorrect recipient, the recipient does not want to receive responses to the email, and the like, is received. In response to the indication, responses to the email are filtered by not sending the response to an email address in the list of email addresses.
Other features allow the recipient to identify a correct recipient of email. Also, if an email address was sent with an invalid address, based on a non-delivery report, the invalid address can be removed from responses to the email. The above systems can also be implemented between domains and with peer-to-peer clients.

28 Claims, 10 Drawing Sheets

REMOVING OR CORRECTING EMAIL RECIPIENTS FROM AN EMAIL CHAIN

TECHNICAL FIELD

The system and method relates to email systems and in particular to email systems that allow users to control who receives responses to emails.

BACKGROUND

In current email systems, it is easy for the sender of an email to accidentally add an incorrect person to an email. For example, where the names of the persons are similar (i.e., Jon Smith and John Smith), a person can easily select the wrong person to send an email to. This results in the wrong person getting the email. Even though the person who incorrectly received the email may forward the email to the correct person, a problem still exists. If the email is part of an email chain that has other recipients, the wrong person continues to get copied for all the emails, thus exacerbating the problem. To correct this problem, the incorrectly addressed recipient of the email can send an email to all the recipients of the email and ask them to remove the incorrect recipient from the email chain. This is problematic at best, as sometimes a person may forget to remove the incorrect recipient from the email list.

Similarly, if the subject matter of the email chain has changed, a person may want to remove themselves from the email chain in order to not receive additional emails that are no longer of interest to the person. Likewise, if an email address is invalid, persons on the email chain may get messages indicating that the email address is invalid.

The above problems clog up users' email systems with unwanted emails and cause frustration for the users who already have difficulty managing large email in-boxes. What is needed is a solution where users can control responses in email chains.

SUMMARY

The system and method are directed to solving these and other problems and disadvantages of the prior art. An email server receives an email. The email has a list of email addresses that includes the sender's email address and the recipient addresses. The email is then sent to the recipients. An indication associated with one of the email address, such as the email address is invalid, the email address is for an incorrect recipient, the recipient does not want to receive responses to the email, and the like, is received. In response to the indication, responses are filtered by not sending the response to an email address in the list of email addresses.

If the recipient knows who the correct recipient of email is, the recipient can have responses to the email sent to the correct recipient. If an email was sent with an invalid address, based on a non-delivery report, the invalid address can be removed from responses to the email. If the email address is invalid, but an alternative email address is known for the invalid email address, the invalid email address can be replaced with the alternative email address.

The system and method also include the ability to filter responses for addresses that are on different email servers on the same domain or to filter responses in different email domains. Also introduced is a system and method for implementing the above features using a peer-to-peer email client.

BRIEF DESCRIPTION OF THE DRAWINGS

In order to describe the manner in which other advantages and features of the disclosure can be obtained, a more particular description of the principles briefly described below will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

The following description and associated Figures teach the best mode of the invention. For the purpose of teaching inventive principles, some conventional aspects of the best mode may be simplified or omitted. The following claims specify the scope Of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents. The following descriptions of email messaging systems and methods can be implemented using standard protocols such as Simple Mail Transfer Protocol (SMTP), Multipurpose Internet Mail Extensions (MIME). RFC-822, and the like.

Figure 1:
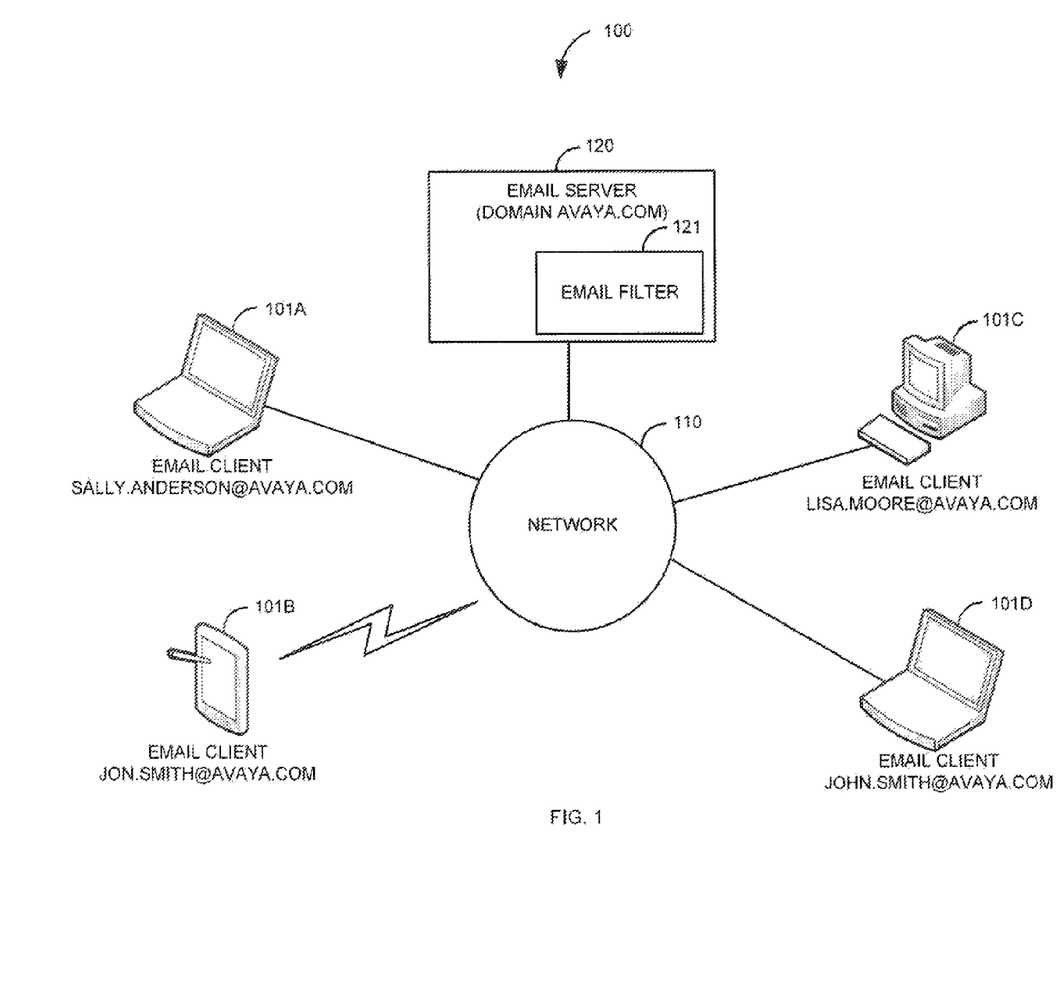
FIG. 1 is a block diagram of a first illustrative system for filtering responses to emails.

FIG. 1 is a block diagram of a first illustrative system 100 for filtering responses to emails. The first illustrative system 100 comprises email clients 101A-101D, network 110, and email server 120. Email client 101A-101D can be any device that can send and receive an email, such as a Personal Computer (PC), a laptop computer, a tablet computer, a Personal Digital Assistant (PDA), a cellular telephone, and the like. In this example, email clients 101A-101D are in the same email domain (Avaya.com). Network 110 can be any type of network, such as the Internet, a Local Area Network (LAN), a Wide Area Network (WAN), the Public Switched Telephone Network (PSTN), a cellular network, a corporate network, a combination of these, and the like.

Email server 120 can be implemented on any device that can process emails, such as a server, a Private Branch Exchange (PBX), a collaboration server, and the like. Email server 120 can implement a variety of protocols, such as a Simple Mail Transfer Protocol (SMTP), Internet Message Access Protocol (IMAP), Post Office Protocol (POP), a proprietary protocol, and the like. In this example, email server 120 is the email server for Avaya.com. Email server 120 further comprises email filter 121. Email filter 121 is any software/hardware that can filter emails. Email filter 121 can be implemented in a variety of ways, such as in a daemon, in a thread, in in-line code, and the like.

Email server 120 receives an email from email client 101A. The email comprises a list of email addresses that includes the sender email address (SALLY.ANDERSON@AVAYA.COM), and one or more recipient email addresses. In this example, the recipient email addresses include JON.SMITH@AVAYA.COM (email client 101B), and LISA.MOORE@AVAYA.COM (email client 101C). Sally Anderson intended the email to go to Lisa Moore and John Smith. Due to the similar names, Sally accidentally included Jon Smith in the email instead of John Smith.

Email server 120 sends the email (received from email client 101A) to the list of recipients (JON.SMITH@AVAYA.COM, and LISA.MOORE@AVAYA.COM). When Jon Smith receives the email, he recognizes that the email was not intended for him, but instead for John Smith. Jon Smith indicates (via a graphical interface or some other mechanism in email client 101B) that the email that was addressed to him was not sent to the correct person and should be sent to John Smith. Email client 101B sends the indication that the email was incorrectly addressed to Jon Smith and should be sent to John Smith. Email server 120 receives the indication from email client 101B. In response to the indication, email filter 121 creates a thread or process to filter any responses to the email to not send the response to email client 101B (JON.SMITH@AVAYA.COM) and instead send a response to email client 101D (JOHN.SMIT@AVAYA.COM).

Lisa Moore decides to respond to the email and responds, to all. Email server 120 receives the response from email client 101C. Email filter 121 filters the response to the email by sending the response to SALLY.ANDERSON@AVAYA.COM and JOHN.SMITH@AVAYA.COM. The response to the email is not sent (or addressed) to email client 101B (JON.SMITH@AVAYA.COM). The response sent to Sally Anderson and John Smith no longer contains Jon Smith's email address, thus resulting in Jon Smith being removed from any future responses.

Figure 2:
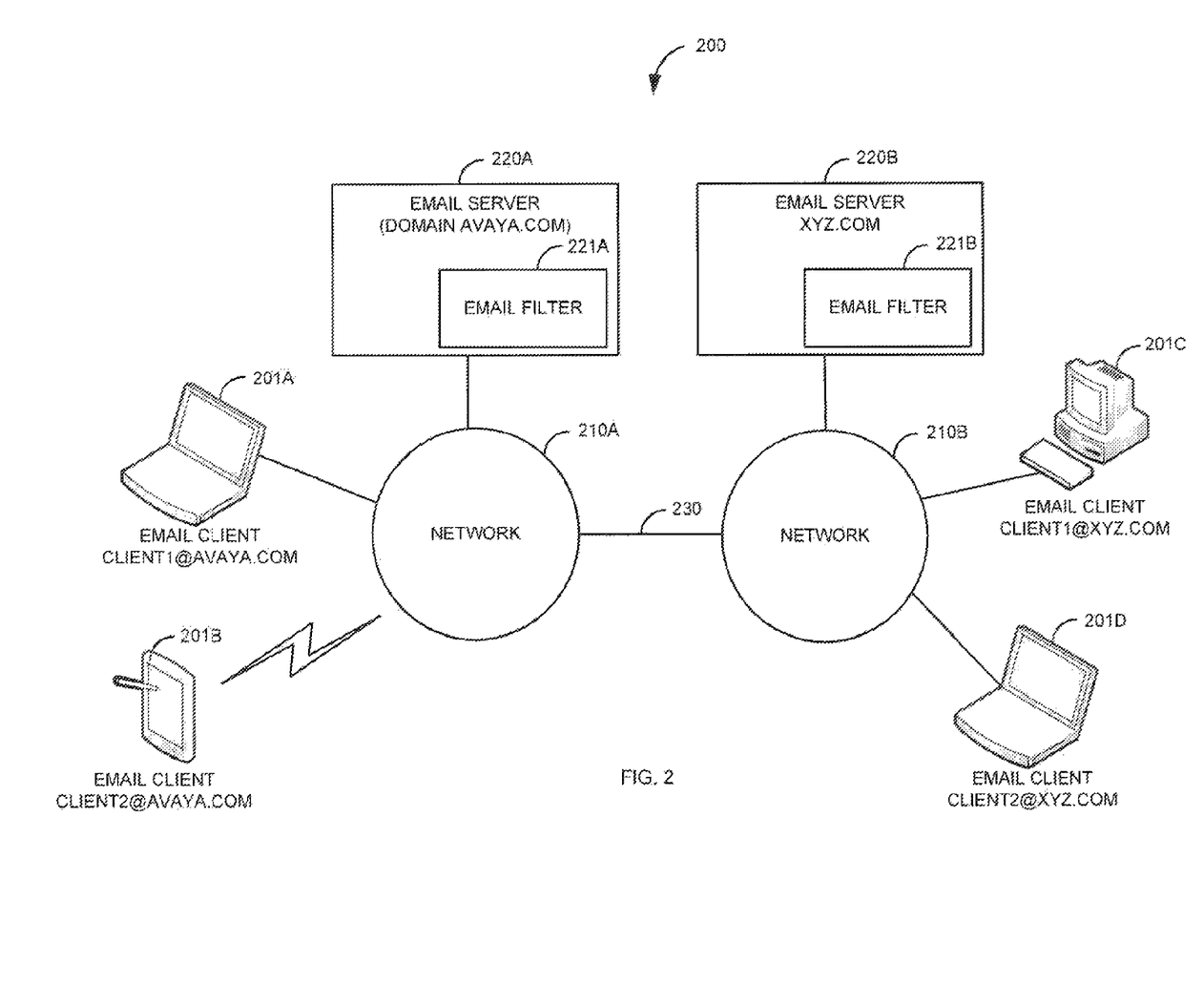
FIG. 2 is a block diagram of a second illustrative system for filtering responses to emails on different email servers or in multiple email domains.

FIG. 2 is a block diagram of a second illustrative system 200 for filtering responses to emails on different email servers or in multiple email domains. The second illustrative system 200 comprises email clients 201A-201C, networks 210A-210B, and email servers 220A-220B. Email client 201A-201D can be any device that can send and receive an email, such as a Personal Computer (PC), a laptop computer, a tablet computer, a Personal Digital Assistant (PDA), a cellular telephone, and the like. Email servers 220A-220B can be implemented on any device that can process emails. Email servers 220A-220B can implement a variety of protocols, such as a Simple Mail Transfer Protocol (SMTP), Internet Message Access Protocol (IMAP), Post Office Protocol (POP), a proprietary protocol, and the like. Email servers 220A-220B further comprise email filters 221A-221B. Networks 210A-210B can be any type of network, such as the Internet, a Local Area Network (LAN), a Wide Area Network (WAN), the Public Switched Telephone Network (PSTN), a cellular network, a corporate network a combination of these, and the like.

Entail server 220A, network 210A, and email clients 201A-201B are part of the Avaya.com email domain. Email server 220B, network 210B, and email clients 201C-201D are part of the xyz.com email domain. The Avaya.com email domain and the xyz.com email domain are connected through link 230. Email server 220B is shown in a different email domain (XYZ.COM) than email server 220A.

Email server 220A receives an email from email client 101A. The email comprises a list of email addresses that includes the sender email address (CLIENT1@AVAYA.COM), and one or more recipient email addresses. In this example, the recipient email addresses include CLIENT1@XYZ.COM (email client 201C), and CLIENT2@XYZ.COM (email client 201D).

Email server 220A, on recognizing that the recipient email addresses (CLIENT1@XYZ.COM and CLIENT2@XYZ.COM) are in the XYX.COM email domain, sends the email to email server 220B, which is in the xyz.com email domain. Email server 220B sends the email to CLIENT1@XYZ.COM (201C) and CLIENT2@XYZ.COM (201D). The user at email client 201D recognizes that the email was not intended for him. The user of email client 201D indicates that the email was sent to an incorrect recipient, but does not know who the email was intended for. Email server 220B receives the indication that the email that was sent to email client 201D was sent to an incorrect recipient.

In response to the indication, email server 220B looks up the list of email addresses in the email and determines that one of the parties to the email (CLIENT1@XYZ.COM) is in the xyz.com email domain and one of the parties to the email (CLIENT1@AVAYA.COM) is in the Avaya.com email domain. Email filter 221B creates a thread or process to filter any responses to the email (sent from email client 201C. CLIENT1@XYZ.COM) to not send the response to email client 201D (for CLIENT2@XYZ.COM). Email server 220B also sends a message to email filter 221A to filter any response to the email sent from CLIENT1@AVAYA.COM (201A). The message can be sent using standard email protocols, such as SMPT, MIME, and the like. Upon receiving the message, email filter 221A creates a thread or process to filter any responses to the email sent from email client 201A to not send the response to CLIENT2@XYZ.COM (201D).

Email client 201C responds to the email by responding to all. Email server 220B receives the response from email client 201C. Email filter 221B filters the response to the email by sending the response to CLIENT1@AVAYA.COM. The response to the email is not sent to email client 201D (CLIENT2@XYZ.COM). Thus, no responses to the email are sent to email client 201D (CLIENT2@XYZ.COM). Likewise, if a response to all is sent from email client 201A (CLIENT1@AVAYA.COM), email filter 221A filters the response to the email by only sending a response to email client 201C (CLIENT1@XYZ.COM). The response to the email is not sent to email client 201D (CLIENT2@XYZ.COM).

In the above example, the second illustrative system 200 is shown to comprise two email domains (Avaya.com and xyz-.com). However, the above described processes can also work on different email servers 220 in the same domain. For example, email server 220A and 220B can both be email servers in the email domain (Avaya.com). Instead of email filter 221 sending the messages to another domain, email filter 221 can send the message to a different email filter 221 on a second email server in the same domain (where other users in the list of email addresses reside).

Figure 3:
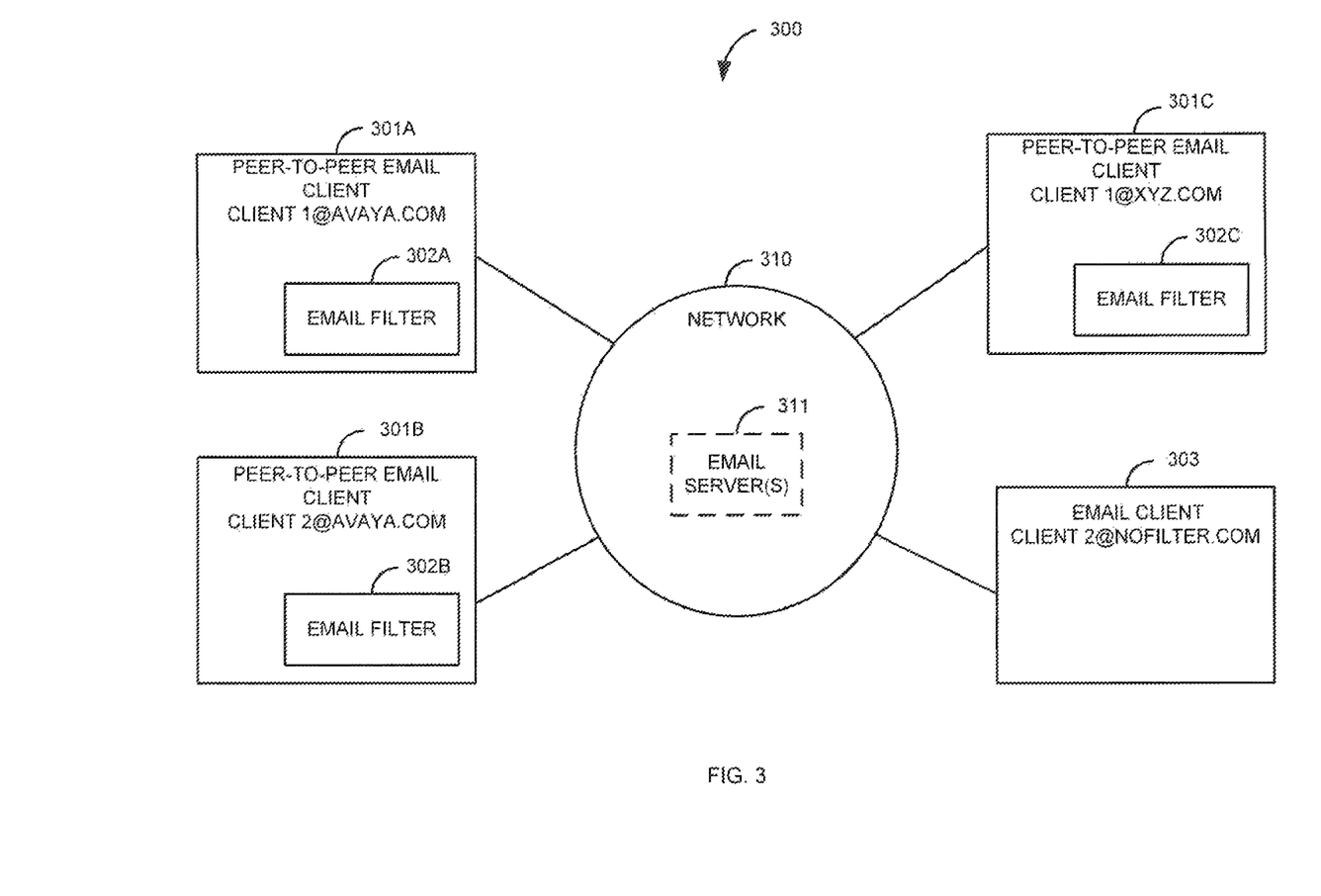
FIG. 3 is a block diagram of a third illustrative system for filtering responses to emails with peer-to-peer email clients.

FIG. 3 is a block diagram of a third illustrative system 200 for filtering responses to emails with peer-to-peer email clients 301. The third illustrative system 300 comprises peer-to-peer email clients 310A-301C, email client 303, and network 310. Peer-to-peer email clients 301A-301C can be any device that can send messages to other peer-to-peer email clients 301. Peer-to-peer email clients 301A-301C can be implemented in a variety of devices, such as a Personal Computer (PC), a tablet computer, a telephone, a cellular telephone, a Personal Digital Assistant, and the like. Email client 303 can be any email client that can send and receive emails. Network 310 can be any type of network, such as the Internet, a Local Area Network (LAN), a Wide Area Network (WAN), the Public Switched Telephone Network (PSTN), a cellular network, a corporate network, a combination of these, and the like. Network 310 is shown further comprising email server(s) 311. However, network 310 does not have to have any email servers 311.

Peer-to-peer email client 301C (CLIENT1@XYZ.COM) sends an email to peer-to-peer email clients 301A (CLIENT1@AVAYA.COM) and peer-to-peer email client 301E (CLIENT2@AVAYA.COM). The email may be sent via email server 311 using previously described protocols and then sent to peer-to-peer email clients 301A and 301B, or can be directly sent to peer-to-peer email clients 301A and 301B from peer-to-peer email client 301C. Peer-to-peer email client 301A receives the email for user (recipient) of email client 301A. The email includes a list of email addresses that includes the sender email address (CLIENT1@XYZ.COM) and one or more recipient email addresses (CLIENT2@AVAYA.COM). The list of email addresses may or may not include the recipient email address of peer-to-peer email client 301A (i.e., it could just be sent to the IP address of peer-to-peer email client 301A).

Peer-to-peer email client 301A gets an indication that the email was sent to an incorrect recipient (CLIENT1@AVAYA.COM), with an option to identify the correct recipient. Likewise, the indication could be that the recipient does not want future responses to be sent to the recipient's email address. In response to the indication, email filter 302A sends a message to the addresses in the list of email addresses (in this example, CLIENT1@XYZ.COM (301C) and CLIENT2@AVAYA.COM (301B)). The message indicates to not send any responses to the email address (CLIENT1@AVAYA.COM) of peer-to-peer email client 301A.

Email clients 301B and 301C receive the message and email filters 302B and 302C create/modify threads/processes that filter responses to the email so that they are not sent to peer-to-peer email client 301A. If either email client 301B or 301C responds to the email, email filter 302B or 302C filter the response and do not send a response to peer-to-peer email client 301A.

The recipient at peer-to-peer email client 301A can later indicate that he/she wants now to receive future responses to the email. In response to this indication, email filter 302A sends a message to each of the email filters 302B and 302C to send a response to the email (or later responses to the email) to the address (CLIENT1@AVAYA.COM) of the recipient at email client 301A.

Peer-to-peer email clients 301A-301C can also determine if an email client 303 does not have an email filter 302. Assume for example that the original email described above also included email client 303. When the message is sent from email filter 302A (based on the indication) to email client 303, since email client 303 does not have an email filter, email client 303 will not respond. Correctly to the message. Based on this determination that email client 303 does not have email filter 302, email filter 302A can instead send an email indicating not to send responses to the email address.

Figure 4A:
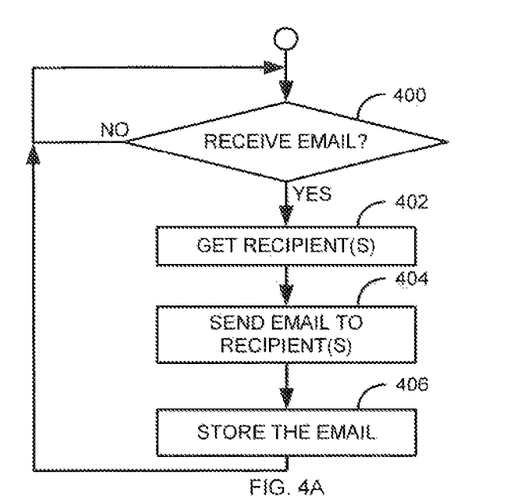
FIG. 4A is a flow diagram of a method for receiving and sending emails in an email server.

FIG. 4A is a flow diagram of a method for receiving and sending mails in an email server (120, 220). Illustratively, email clients (101, 201), peer-to-peer email clients 301 email client 303, and email servers (120, 220) are stored-program-controlled entities, such as a computer or processor, which performs the method of FIGS. 4-10 and the processes described herein by executing program instructions stored in a tangible computer readable storage medium, such as a memory or disk.

Email server (120, 220) wait to receive an email in step 400. If no email is received, email server (120, 220) continues to wait. When an email is received in step 400, email server (120, 220) gets 402 the recipients of the email. Email server (120, 220) sends 404 the email to the recipients. How email server (120, 220) sends the email to the recipients can vary based on implementation. For example, if all the recipients are in the same domain as shown in FIG. 1, email server 120 can send the email directly to the email clients 101. If all or some of the recipients are in a different domain or on a different email server 220 in the same domain (as shown in FIG. 2), email server 220 can send the emails to the email server 220 in the other domain or different email server 220 in the same domain. Email server (120, 220) then stores 406 the email and the process goes back to step 400.

Figure 4B:
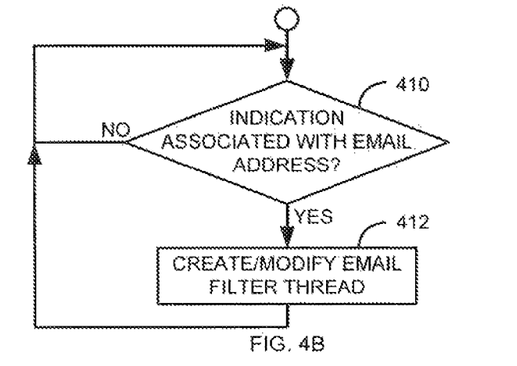
FIG. 4B is a flow diagram of a method for creating or modifying email filters for responses to emails.

FIG. 4B is a flow diagram of a method for creating or modifying email filters (121, 221) for responses to emails. Email filter (121, 221) waits for an indication associated with the email address in step 410. The email address is typically the email address of the email client (101, 201) (i.e., the recipient at the email client). The email address could be the email address that is a different email address of the client if, for example, someone is acting as a proxy for the recipient of the email. If no indication is received in step 410, the process continues to wait.

If an indication is received in step 410, the process creates modifies email filter (121, 221). An indication can come from the recipient or be based on other events. For example, the indication can be that the recipient of the email is an incorrect recipient or the recipient of the email no longer wants to receive future responses to the email. On the other hand, the indication can be from email server (120, 220) based on email server (120, 220) receiving anon-delivery report. The non-delivery report is an indication that the email address to which the email was sent was invalid. Email filter (121, 221) modifies or creates 412 the email filter thread based on the indication and the process goes to step 410.

Figure 4C:
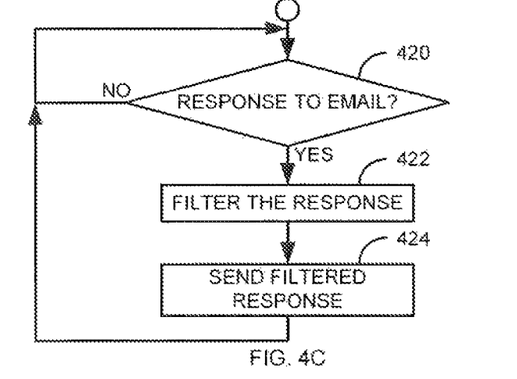
FIG. 4C is a flow diagram of a method for filtering responses to emails.

FIG. 4C is a flow diagram, of a method for filtering responses to emails. The email filter thread created/modified in step 412 waits for a response to the email in step 420. If a response to the email is not received the process waits in step 420. When a response to the email is received in step 420, email filter (121, 221) filters 422 the response. For example, if the indication is a non-delivery report, email filter 121 will filter the response so that the response is not sent to the email address identified in the non-delivery report. Email server (120, 220) sends 424 the response to the email and the process goes to step 420.

Figure 5:
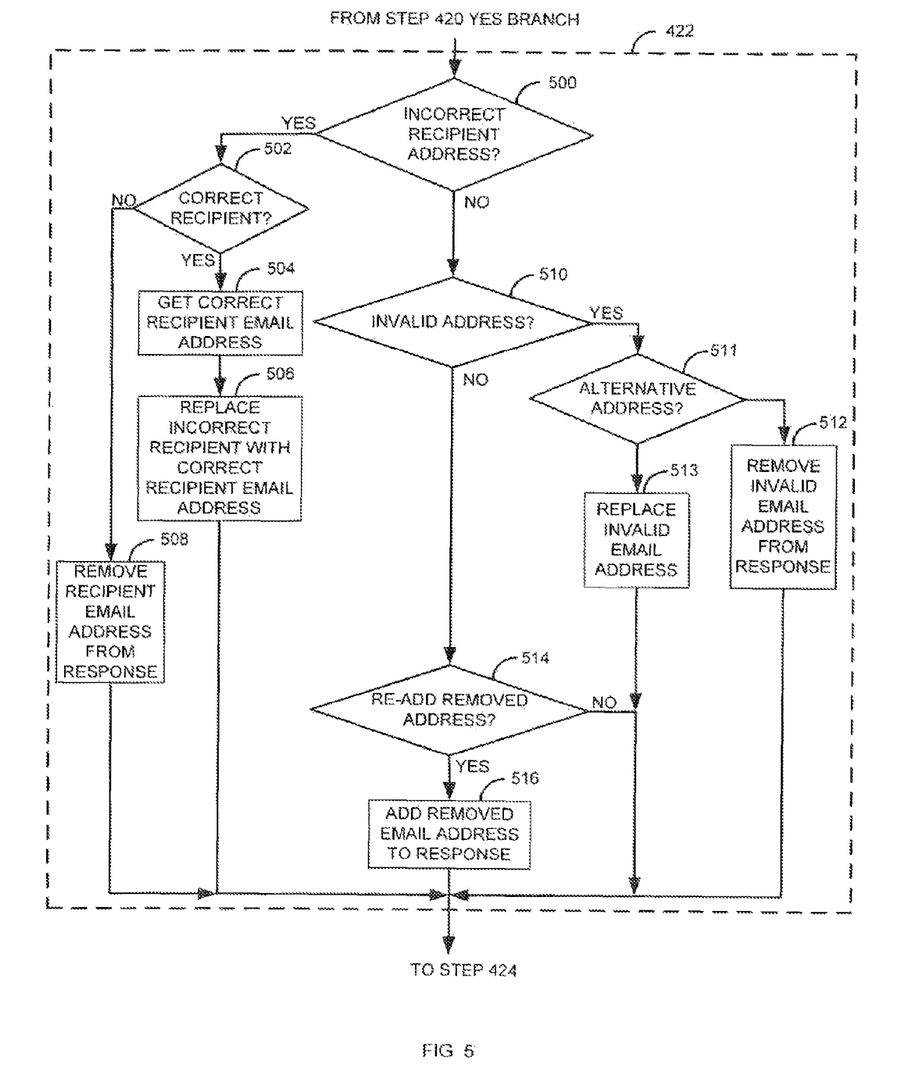
FIG. 5 is a flow diagram of a method for filtering responses to emails.

FIG. 5 is a flow diagram of a method for filtering responses to emails. FIG. 5 is an exemplary expanded view of step 422 in FIG. 4. The process begins after a response to the email is received in step 420. Email filter (121, 221) determines if the indication is an incorrect recipient email address in step 500. If the recipient email address is incorrect in step 500, email filter (121, 221) determines if the correct recipient email address is known in step 502. If the correct recipient email address is not known in step 502, the recipient email address is removed 508 from the response and the process goes to step 424. If the correct recipient email address is known in step 502, email filter (121, 221) gets 504 the correct recipient email address (i.e., given by the recipient in a user interface). Email filter (121, 221) replaces 506 the incorrect recipient email, address with the correct recipient email address and the process goes to step 424.

If email filter (121, 221) determines in step 500 that the indication is not an incorrect recipient, email filter (121, 221) determines if the email address is invalid in step 510. If the email address is invalid in step 510, email filter (121, 221) determines in step 511 if there is an'alternative address for the invalid email address. An email address may have been valid at one time, but may now be invalid for different reasons, such as a person leaving a company or changing their name. Alternatively, an email address may be invalid because it was typed incorrectly. Email filter (121, 221) can have an alternative email address to an invalid email address (indicated by a user or administrator). For example, a person have changed their name and as a result, their email address has changed. The alternative email address would be the new email address after the name change. Email filter (121, 221) could have an alternative email address to a commonly mistyped email address. If email filter (121, 221) determines in step 511 that there is not an alternative email address for the invalid email address, email filter (121, 221) removes 512 the invalid email address from the response and the process goes to step 424. If there is an alternative email address in step 511, email filter (121, 221), replaces 513 the invalid email address with the alternative email address and the process goes to step 424.

Otherwise, if email filter (121, 221) determines in step 510 that the email address is not invalid in step 510, email filter (121, 221) determines in step 514 if the recipient wants his/her email address to be re-added to the response. In this case, the user would have had his/her email address removed previously from the response in step 508. If the recipients wants his/her email re-added to the response in step 514, email filter (121, 221) adds 516 the email address to the response and the process goes to step 424. Otherwise, if the recipient does not want his/her email address re-added in step 514, the process goes to step 424.

FIG. 5 is shown as a process of handling one type of filter. For example, if there is an incorrect recipient in step 500, for which a correct recipient is not known, the process will implement step 508 and the filtering will be complete. However, the process of FIG. 5 can be modified as would be obvious so that multiple filters (i.e., correcting a recipient (steps 504 and 506) and removing an invalid address (step 516)) could be completed using the processes of FIG. 5 by having the tests for the type of filter being implemented serially.

Figure 6A:
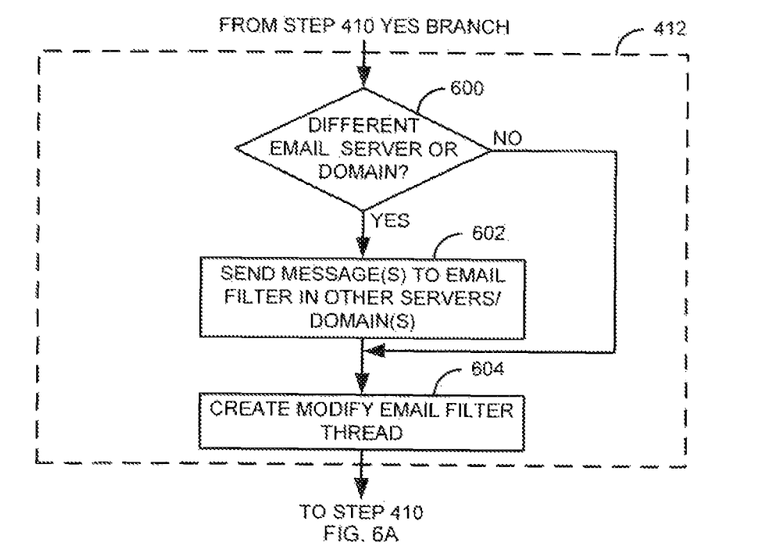
FIG. 6A is a flow diagram of a method for sending messages to filter responses to emails in other email servers and/or other domains.

FIG. 6A is a flow diagram of a method for sending messages to filter responses to emails in other email servers and/or other domains. FIG. 6A is an exemplary expanded view of step 412 in FIG. 4. After receiving an indication in step 410, email filter 221 determines in step 600 if the email address(es) in the list of email addresses are serviced by a different email server 220 in the same email domain or if the email address(es) are at a different email domain. If any of the email addresses in the list of email addresses are not serviced by a different email server 220 in the same domain or at a different email domain, the process goes to step 604.

Otherwise, if any of the email addresses in the list of email addresses are serviced by a different email server 220 in the same domain or at a different email domain, email filter 221 sends 602 a message to the email filter 221 in the different email server 220 in the same email domain or in the different email domain 220. The message can indicate to not send a response to the email address, to replace an incorrect recipient address with a correct recipient address, and the like. Email filter 221 creates/modifies 604 the email filter thread according to the indication and the process goes to step 410.

Figure 6B:
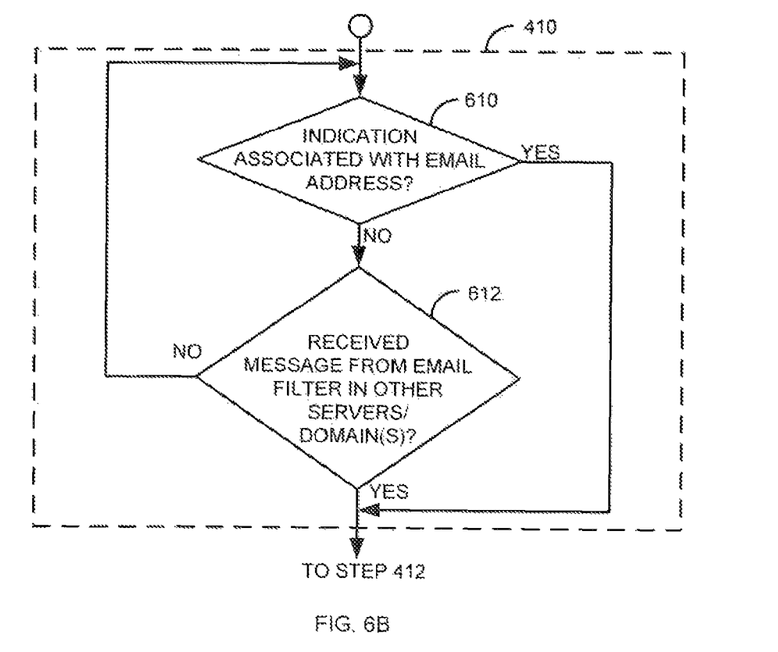
FIG. 6B is a flow diagram of a method for managing filtering of email messages.

FIG. 6B is a flow diagram of a method for managing filtering of email messages. FIG. 6B is an exemplary expanded view of step 410 in FIG. 4. Email filter 221 determines in step 610 if an indication has been received that is associated with an email address. If an indication has been received in step 610, the process goes to step 412. Otherwise, if an indication has not been received in step 610, email filter 221 determines in step 612 if a message has been received from an email filter 221 in different email server 220 in the same domain or au email filter 221 in a different email domain. If a message has been received in step 612, the process goes to step 412 to modify the email filter thread according to the message. If a message has not been received in step 612, the process goes back to step 610.

Figure 7A:
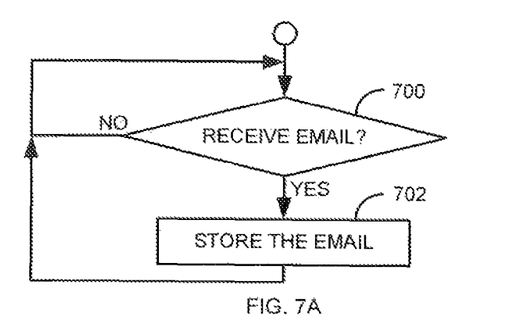
FIG. 7A is a flow diagram of a method for receiving and storing emails in a peer-to-peer email client.

FIG. 7A is a flow diagram of a method for receiving and storing emails in a peer-to-peer email client 301. Peer-to-peer email client 301A waits in step 700 to receive an email. If an email is not received, peer-to-peer email client 301A continues to wait in step 700. If an email is received in step 700, the email is stored 702 by peer-to-peer email client 301A and the process goes to step 700.

Figure 7B:
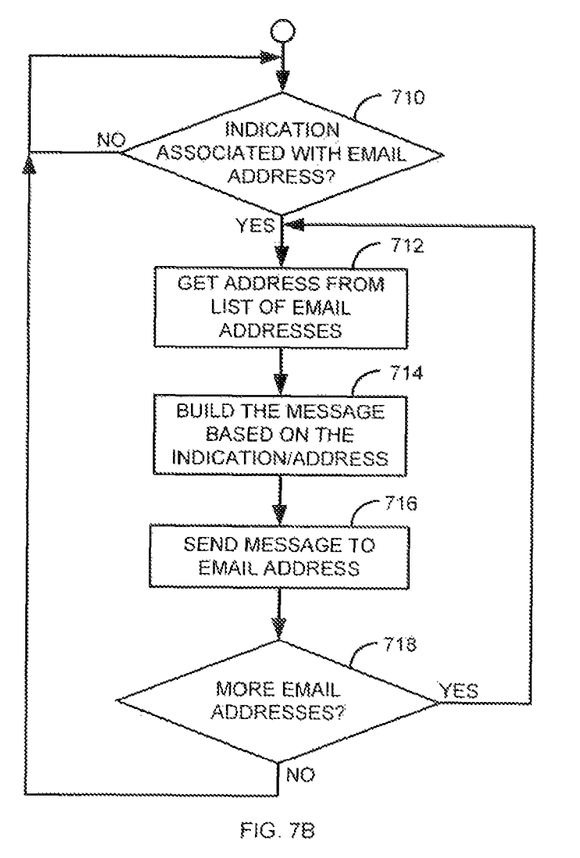
FIG. 7B is a flow diagram of a method for filtering email responses in a peer-to-peer email client.

FIG. 7B is a flow diagram of a method for filtering email responses in a peer-to-peer email client 301. The process begins in step 710 with email filter 302A waiting for an indication that is associated with an email address (typically the email address of the email client 301A (CLIENT1@AVAYA.COM). If an indication is not received, the email filter waits in step 710.

If an indication is received in step 710, email filter 302A gets 712 an email address from the list of addresses. The indication can be to remove the email address of the peer-to-peer email client 301A (i.e., an incorrect recipient or the recipient does not want to receive responses) or to replace the email address of peer-to-peer email client 301A with a different email address (i.e., the recipient is an incorrect recipient and knows the email address of the correct recipient). Email filter 302A builds 714 the message based on the indication and on the other email addresses in the list of email addresses (i.e., peer-to-peer email client 301B or C). Email filter 302A sends 716 the message to the email address of the peer-to-peer email client 301(B or C). Email filter 302 determines if there are any more addresses in the list of email addresses in step 718. If there are more addresses in step 718, the process goes to step 712. Otherwise, the process goes to step 710.

To illustrate the process of FIGS. 7A and 7B, consider the following example. Peer-to-peer mail client 301A receives 700 an email from peer-to-peer email client 301C. The list of email addresses includes CLIENT1@XYZ.COM (the sender 301C) and CLIENT2@AVAYA.COM (a recipient at 301B). Email client 301A stores 702 the email.

The user of peer-to-peer email client 301A indicates that he does not want to receive any responses to the email. Email filter 302A gets 712 address CLIENT1@XYZ.COM from the list of email addresses. Email filter 302A builds 714 the message indicating not to send responses to CLIENT1@AVAYA.COM. Email filter 302A sends 716 the message to CLIENT1@XYZ.COM. Email filter 302A determines in step 718 that there is one more email address. Email filter 302A gets 712 the email address CLIENT2@AVAYA.COM from the list of email addresses. Email filter 302A builds 714 the message indicating not to send responses to CLIENT1@AVAYA.COM. Email filter 302A sends 716 the message to CLIENT2@AVAYA.COM. Email filter 302A determines that there are no more addresses in step 718 and the process goes to step 710.

Figure 8:
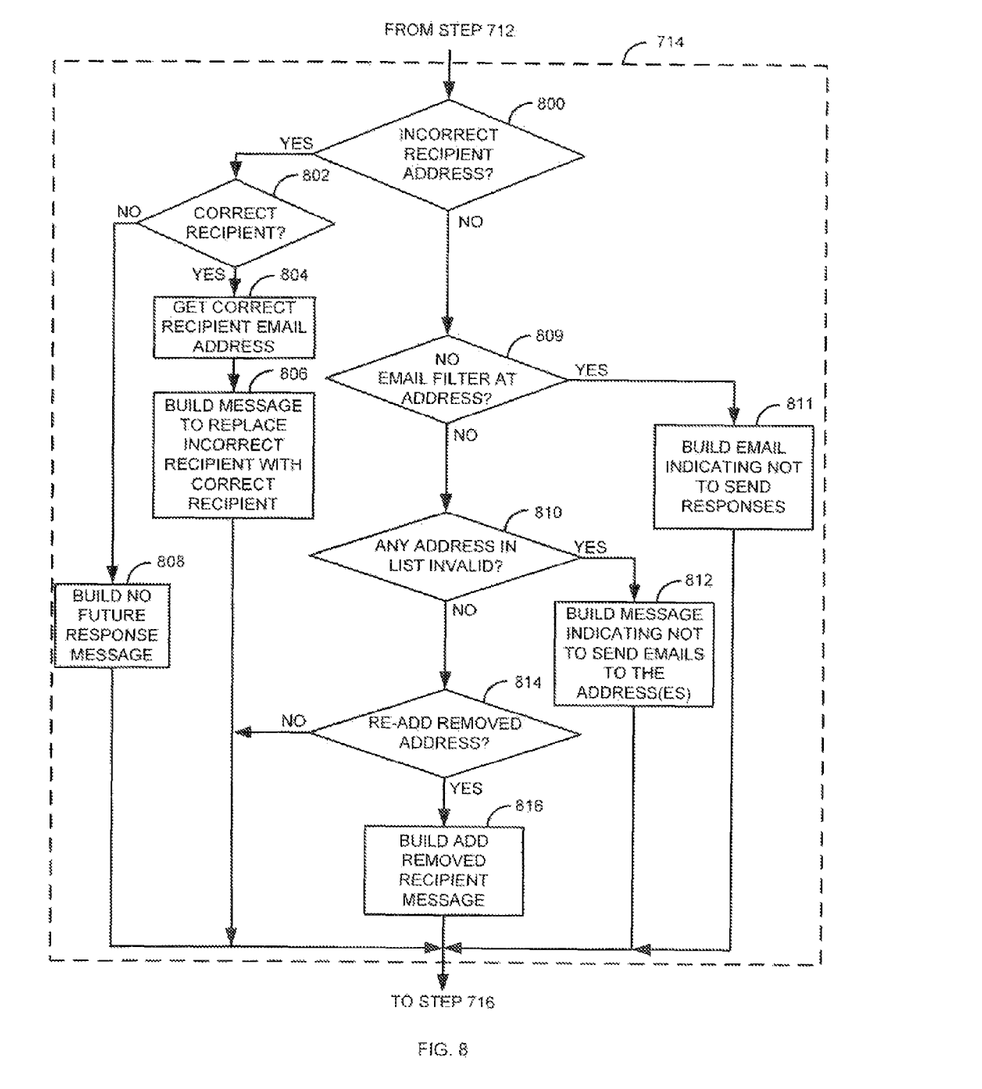
FIG. 8 is a flow diagram of a method for filtering email responses in a peer-to-peer email client.

FIG. 8 is a flow diagram of a method for filtering email responses in a peer-to-peer email client 301. FIG. 8 is an exemplary expanded view of step 714 in FIG. 7. After getting the email address in step 712, email filter 302 determines in step 800 if the indication is that the recipient was an incorrect recipient. If the recipient is an incorrect recipient in step 800, email filter 302 determines in step 802 if there is a correct recipient. If there is not a correct recipient, email filter 302 builds 808 a no future response message and the process goes to step 716. The no future response message indicates for the email filter 302 to which the message is sent, to not send a response email to the recipient of the email. Otherwise, if the recipient identified a correct recipient in step 802, email filter 302 gets 804 the correct recipient email address. Email filter 302 builds 806 a message that indicates to replace the incorrect recipient email address with the correct recipient email address. The process then goes to step 716.

If email filter 302 determines in step 800 that the indication is that the recipient is not an incorrect recipient, email filter 302 determines in step 809 if peer-to-peer email client 301 does not have an email filter 302. If the peer-to-peer email client 301 does not have an email filter 302 in step 809, email filter builds 811 an email (which is sent in step 716) indicating not to send responses to the email (or to send a response to a different email address). The process goes to step 716. A determination that a peer-to-peer email client does not have an email filter can be done in various ways, such as by sending a message. A peer-to-peer email client without an email filter will not respond properly to the message.

Otherwise, if email filter 302 determines in step 809 that there is an email filter in step 809, email filter 302 determines in step 810 if any addresses in the list of email addresses is invalid. If one or more of the email addresses are invalid in step 810, email filter 302 builds 812 a message indicating not to send responses to the email to the email address(es) and the process goes to step 716.

Otherwise, if email filter 302 determines in step 810 that there are not any invalid addresses in the list, email filter 302 determines in step 814 if the recipient wants to be re-added to responses to the email. In order to be re-added, the recipient email address must have been removed in step 808. If email filter 302 determines in step 814 that the recipient does not want to be re-added, the process goes to step 716. Otherwise, if email filter 302 determines in step 814 that the recipient wants to be re-added to the email in step 814, email filter 302 builds 816 an add removed recipient message and the process goes to step 716.

FIG. 8 is shown as a process of handling one type of filter. For example, if there is an incorrect recipient in step 800, for which a correct recipient is not known, the process will implement step 808 and the filtering will be complete. However, the process of FIG. 8 can be modified as would be obvious so that multiple filters (i.e., correcting a recipient (steps 804 and 806) and removing an invalid address (step 512)) could be completed using the processes of FIG. 8 by having the tests for the type of filter being implemented serially.

Figure 9:
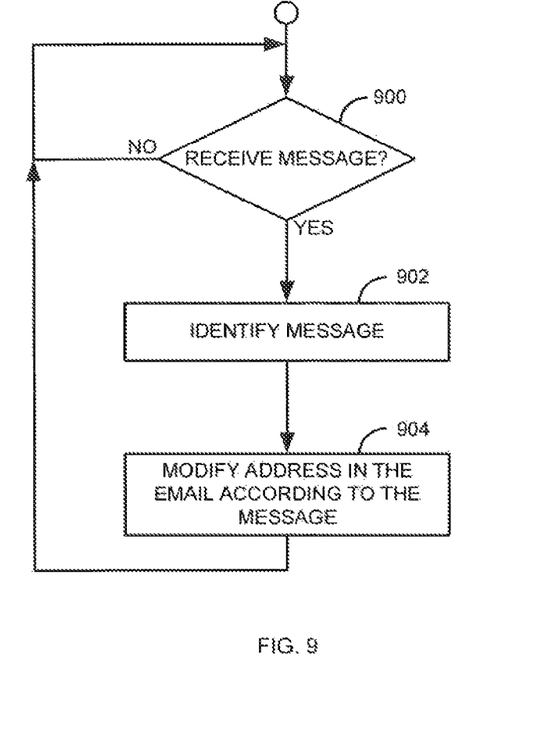
FIG. 9 is a flow diagram of a method for filtering email responses in a peer-to-peer email client.

FIG. 9 is a flow diagram of a method for filtering email responses in a peer-to-peer email client 301. The process begins with peer-to-peer email client 301 waiting 900 to receive a message from another peer-to-peer email client 301. When peer-to-peer email client 301 receives a message in step 900, email filter 301 identifies 902 the message. Email filter 302 modifies 902 one or more addresses in the email according to the message. For example, if the message is to not send a response to a specific email address, email filter 302 will remove that email address from the email. The process goes to step 900 to wait for another message.

Figure 10:
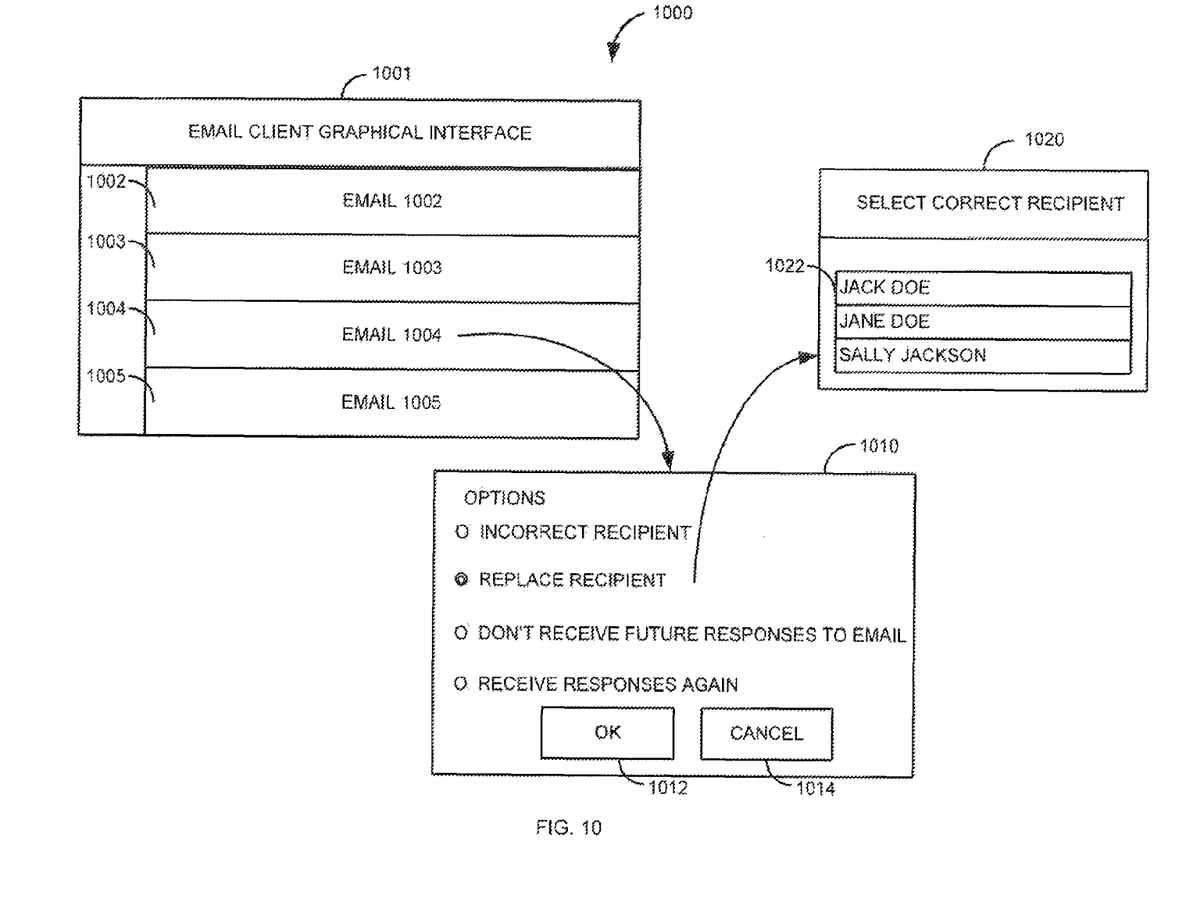
FIG. 10 is a diagram of a graphical user interface for filtering emails.

FIG. 10 is a diagram of a graphical user interface 1000 for filtering emails. Graphical user interface 1000 is used by a recipient of an email to indicate that the recipient was an incorrect recipient, to not receive a future response to the email, or to be re-added to the email. Graphical user interface 1000 can be used for email clients 101, 201, and peer-to-peer email clients 301.

Graphical user interface 1000 comprises email client graphical interface 1001, options window 1010, and select correct recipient window 1020. Email client graphical interface 1001 comprises emails 1002-1005 that the recipient has received. Email client graphical interface 1001 can be brought up when the user selects a button, menu, and the like indicating that the recipient wants to change how responses to an email are handled. When the recipient wants to take an action in regard to one of the emails 1002-1005, the recipient selects (i.e., clicks on) an email 1002-1005. In this example, the recipient has selected email 1004. When email 1004 is selected, options window 1010 is displayed. The recipient can select how he/she wants the response to the email handled. The user can select the following options: 1) incorrect recipient, 2) replace recipient, 3) don't receive future response, and 4) receive responses again. In this example, the receive responses again is not selectable (i.e., grayed out) if the recipient has not previously indicated that the user does not want to receive future responses to the email. The recipient selects which option he/she wants and then clicks the OK button 1012. If the recipient does not want to take an action the recipient can select the cancel button 1014.

If the recipient selects replace recipient and clicks OK button 1012, select correct recipient window 1020 is displayed. The recipient can then select who the recipient wants responses sent to by selecting a user from the email list 1022.

If the recipient selects incorrect recipient or don't receive future response to email and clicks on OK button 1012, the indication is then sent to an email filter (121, 221, or 302) and the action is implemented in email filter (121, 221, or 302). If the recipient has previously selected don't receive future responses to email and selects receive responses again, then email filter (121, 221, or 302) implements this in the email filter (121, 221, or 302).

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," one or more of A, B, or C" and "A, B, and/or C" means A alone, B alone, C alone, A and B together, A and C together, B and C together, or A, B and C together.

Herein, the term "a," "an," or another entity refers to One or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving at an email server, an email, the email comprising a list of email addresses, wherein the list of email addresses includes a sender email address and one or more recipient email addresses;
   sending from the email server, the email to the one or more recipient email addresses;
   receiving at the email server, an indication associated with an email address from the list of email addresses; and
   responsive to receiving the indication, filtering in an email filter a response to the email by not sending the response to the email address from the list of email addresses.

2. The method of claim 1, wherein the indication identifies at least one of the following: that the email address from the list of email addresses is invalid; that the email address from the list of email addresses is for an incorrect recipient; or that a recipient of the email does not want a future response to the email to he sent to the email address from the list of email addresses, wherein the email address from the list of email addresses is the recipient's email address.

3. The method of claim 2, wherein the indication is that the recipient of the email does not want the future response to the email to be sent to the email address from the list of email addresses and further comprising the steps of:
   receiving an indication that the recipient of the email now wants to receive the future response to the email; and
   responsive to the indication that the recipient of the email wants to receive the future response, the email filter no longer filtering the response to the email.

4. The method of claim 2, wherein the indication is that the email address from the list of email addresses is for an incorrect recipient, the indication further comprising an email address of a correct recipient, and further comprising the step of: sending a response to the email to the email address of the correct recipient.

5. The method of claim 2, wherein the indication is that the email address from the list of email addresses is invalid and the indication is based on receiving a non-delivery report sent in response to the email.

6. The method of claim 2, wherein the indication is that the email address from the list of email addresses is invalid and further comprising the step of replacing the invalid email address with an alternative email address.

7. The method of claim 1, wherein at least one of the email addresses in the list of email addresses resides at a different email domain or a different email server in a same email domain and further comprising the steps of:
   sending a message to an email filter in the different email domain or in the same email domain to filter the response to the email by not sending the response to the email address in the-list of email addresses.

8. A method comprising:
   receiving at a first peer-to-peer email client, an email for a recipient of the first peer-to-peer email client, the email comprising a list of email addresses, wherein the list of email addresses includes a sender email address and one or more recipient email addresses;
   receiving at the first peer-to-peer email client, an indication regarding the email address of the recipient of the first peer-to-peer email client; and responsive to the indication, sending from a first email filter, a message to the addresses in the list of email addresses, wherein the message indicates to not send any responses to the email, to the email address of the recipient of the first peer-to-peer email client.

9. The method of claim 8, wherein the list of email addresses does not include the email address of the recipient of the first peer-to-peer email client.

10. The method of claim 8, wherein the indication identifies at least one of the following:
    that the email address from the list of email addresses is invalid:
    that the email address of the recipient of the first peer-to-peer email client is for an incorrect recipient of the email; or
    that the recipient of the first peer-to-peer email client does not want a future response to the email to be sent to the email address of the recipient of the first peer-to-peer email client.

11. The method of claim 10, wherein the indication is that the recipient of the first peer-to-peer email client does not want the future response to the email to be sent to the email address of the recipient of the first peer-to-peer email client and further comprising the steps of:
    receiving an indication that the recipient of the email of the first peer-to-peer email client now wants to receive the future response to the email; and
    responsive to the indication that the recipient of the email of the first peer-to-peer email client wants to receive the future response, sending a message the each of the email addresses in the list of email addresses to send responses to the email to the address of the recipient of the first peer-to-peer email client.

12. The method of claim 10, wherein the indication is that the email address of the recipient of the first peer-to-peer email client is for an incorrect recipient, the indication further comprising an email address of a correct recipient, and further comprising the step of: sending a message to each of the email addresses in the list of email addresses to send a response to the email to the email address of the correct recipient.

13. The method of claim 10, further comprising the steps of receiving at a second peer-to-peer email client, the email; and receiving the message in an email filter in the second peer-to-peer email client and the email filter in the second peer-to-peer email client removing the email address of the recipient of the first peer-to-peer email client from the email received at the second peer-to-peer email client.

14. The method of claim 10, further comprising the steps of: receiving at a second email client, the email; determining in the first peer-to-peer email client that the email addresses of the second email client is in the list of email addresses and the second email client does not have an email filter; responsive to the determining, not sending the message that indicates not to send any responses to the email to the email addresses of the second email client; and sending an email indicating not to send responses to the email to the email address of the second email client.

15. A system comprising:
an email server configured to receive an email, the email comprising a list of email addresses, wherein the list of email addresses includes a sender email address and one or more recipient email addresses,
send the email to the one or more recipient email addresses,
receive an indication associated with an email address from the list of email addresses; and responsive to receiving the indication, an email filter configured to filter a response to the email by not sending the response to the email address from the list of email addresses.

16. The system of claim 15, wherein the indication identifies at least one of the following: that the email address from the list of email addresses is invalid; that the email address from the list of email addresses is for an incorrect recipient; or that a recipient of the email does not want a future response to the email to be sent to the email address from the list of email addresses, wherein the email address from the list of email addresses is the recipient's email address.

17. The system of claim 16, wherein the indication is that the recipient of the email does not want the future response to the email to be sent to the email address from the list of email addresses and the email filter is further configured to: receive an indication that the recipient of the email now wants to receive the future response to the email; and responsive to the indication that the recipient of the email wants to receive the future response, the email filter is further configured to no longer filter the response to the email.

18. The system of claim 16, wherein the indication is that the email address from the list of email addresses is for an incorrect recipient, the indication further comprising an email address of a correct recipient and the email server is further configured to: send a response to the email to the email address of the correct recipient.

19. The system of claim 16, wherein the indication is that the email address from the list of email addresses is invalid and the indication is based on receiving a non-delivery report sent in response to the email.

20. The system of claim 16, wherein the indication is that the email address from the list of email addresses is invalid and the email filter is further configured to replace the invalid email address with alternative email address.

21. The system of claim 15, wherein at least one of the email addresses in the list of email addresses resides at a different email domain or a different email server in a same email domain and the email server is further configured to: send a message to an email filter in the different email domain or in the same email domain to filter the response to the email by not sending the response to the email address in the list of email addresses.

22. A system comprising:
a first peer-to-peer email client configured to receive an email for a recipient of the first peer-to-peer email client, the email comprising a list of email addresses, wherein the list of email addresses includes a sender email address and one or more recipient email addresses,
receive an indication regarding the email address of the recipient of the first peer-to-peer email client; and responsive to the indication,
a first email filter configured to send a message to the addresses in the list of email addresses, wherein the message indicates to not send any responses to the email to the email address of the recipient of the first peer-to-peer email client.

23. The system of claim 22, wherein the list of email addresses does not include the email address of the recipient of the first peer-to-peer email client.

24. The system of claim 22, wherein the indication identifies at least one of the following: that the email address from the list of email addresses is invalid;
that the email address of the recipient of the first peer-to-peer email client is for an incorrect recipient of the email; or that the recipient of the first peer-to-peer email client does not want a future response to the email to be sent to the email address of the recipient of the first peer-to-peer email client.

25. The system of claim 24, wherein the indication is that the recipient of the first peer-to-peer email client does not want the future response to the email to be sent to the email address of the recipient of the first peer-to-peer email client and the first email titter is further configured to: receive an indication that the recipient of the email of the first peer-to-peer email client now wants to receive the future response to the email; and responsive to the indication that the recipient of the email of the first peer-to-peer email client wants to receive the future response, send a message to each of the email addresses in the list of email addresses to send responses to the email, to the address of the recipient of the first peer-to-peer email client.

26. The system of claim 24, wherein the indication is that the email address of the recipient of the first peer-to-peer email client is for an incorrect recipient, the indication further comprising an email address of a correct recipient, and the peer-to-peer email client is further configured to: send a message to each of the email addresses in the list of email addresses to send a response to the email to the email address of the correct recipient.

27. The system of claim 24, wherein: a second peer-to-peer email client is configured to receive the email; and an email filter in the second peer-to-peer email client is configured to receive the message and remove the email address of the recipient of the first peer-to-peer email client from the email received at the second peer-to-peer email client.

28. The system of claim 24, wherein: a second email client is configured to receive the email; and the first peer-to-peer email client is further configured to determine that the email addresses of the second email client is in the list of email addresses and the second peer-to-peer email client does not have an email filter, responsive to the determining, not send the message that indicates not to send any responses to the email to the email addresses of the second email client, and send an email indicating not to send responses to the email to the email address of the second email client.

* * * * *